Nov. 14, 1950  E. H. HUGENHOLTZ ET AL  2,530,165
CIRCUIT FOR FREQUENCY CONTROL
Filed Dec. 5, 1947
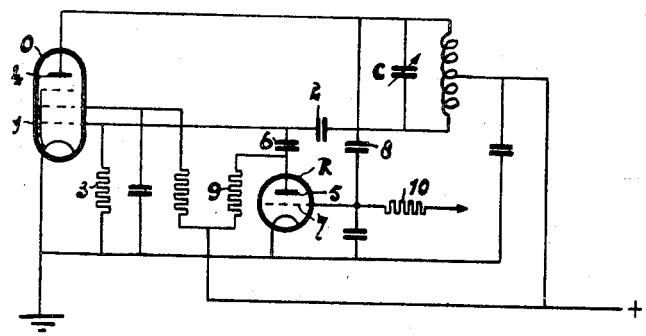
INVENTORS
EDUARD HERMAN HUGENHOLTZ
EGBERT SCHOLTEN
BY Fred M. Vogel
AGENT Patented Nov. 14, 1950

2,530,165

UNITED STATES PATENT OFFICE 2,530,165

CIRCUIT FOR FREQUENCY CONTROL

Eduard Herman Hugenholtz and Egbert Scholten, Eindhoven, Netherlands, assignors to Hartford National Bank and Trust Company, Hartford, Conn., as trustee Application December 5, 1947, Serial No. 789,972 In the Netherlands September 20, 1946

Section 1, Public Law 690, August 8, 1946 Patent expires September 20, 1966

10 Claims. (Cl. 250—36)

In the co-pending United States Patent application Serial No. 675,023, filed June 7, 1946, there is described a circuit for frequency control or frequency modulation in which electrical oscillations generated by back-coupling of a discharge tube are controlled in frequency with the aid of a control quantity, for example a control voltage. This is accomplished by including an impedance in the supply lead of a control electrode of the discharge tube, the value of said impedance being varied in accordance with the control quantity.

The use of the means described in the above-identified application permits obtainment of a deviation from the normal phase difference of 180° between the oscillator electrodes. This deviation is variable under the action of the control quantity and has a value which is restricted by that value of the phase angle at which the oscillator ceases to oscillate. This limiting value is always higher than 90°. As a result, the control range of the circuit-arrangement is compartively limited.

According to the invention, in order to provide a wider control range in a circuit arrangement of the above described type, the variable impedance element comprises a system which behaves as a negative resistance having an adjustable value. Consequently, the control range will become twice as large since correct proportioning of the various quantities permits the phase difference between the oscillator electrodes to be varied between the two limiting values at each side of 180° at which the tube just continues oscillating.

According to the invention, the said negative resistance may be constituted by an auxiliary tube of which two electrode are connected to the same oscillator circuit as the oscillator electrodes of the main tube, but in opposite phase.

The invention will now be explained more fully by reference to the accompanying drawing showing, by way of example, one embodiment thereof.

The circuit substantially comprises an oscillator tube O connected as a Hartley oscillator. The particular connection employed is not essential to the invention since it is also possible to utilize other forms of back-coupling. The control grid 1 is connected, via a condenser 2 and a grid leak resistance 3, to one extremity of a tuning circuit CL, the other extremity of which is connected to the anode 4 of the tube O. The centre of the coil L is connected to the positive terminal of the source of anode current. This circuit oscillates at a frequency equal to the resonant frequency of the circuit CL so long as anode 4 and grid 1 oscillate in exact phase opposition. If, however, this phase angle differs from 180°, the frequency that is generated also varies.

This frequency variation is ensured by a phase shift of the oscillations supplied to grid 1. As in the above-identified application, for this purpose the grid condenser 2 is given a value which is exceptionally small, for example 40 $\mu\mu f$ instead of 300 $\mu\mu f$, and the apparent internal grid resistance is made variable.

According to the invention, for the latter purpose a tube R is connected in parallel to the grid leak resistance 3. The anode 5 of tube R is connected, via a condenser 6, to the control grid 1 of tube O and the grid 7 of tube R is connected, via a condenser 8, to the anode 4 of the tube O. The cathodes of the tubes O and R are grounded and the anode 5 is connected, via a resistance 9, to the positive terminal of the source of anode current. In this circuit the tube R is connected to the turning circuit CL so that tube R acts as a negative resistance in the grid circuit of the tube O. In this case the value of the said resistance is dependent on the biassing potential on grid 7, which is provided by the control voltage supplied to the said grid via a resistance 10. Variation in this control voltage permits the phase angle between grid 1 and anode 4 to be varied between an angle slightly larger than 90°, at which the tube O just continues oscillating, and an angle slightly smaller than 270°, at which the oscillation also has a tendency to cease, hence through a control angle of nearly 180°. This control angle is nearly twice the value of the maximum control angle obtainable with the circuit according to the above identified application.

What we claim is:

1. A circuit arrangement for producing a frequency variable under the control of an input voltage, comprising an oscillator tube provided with a cathode, an output electrode and a control electrode, a tuned circuit having a first point connected to said output electrode, phase shifting means connecting said control electrode to a second point of said tuned circuit, the potentials of said two points varying substantially in phase opposition, said phase shifting means including reactance means serially connected between said control electrode and said second point and further including negative resistance means bridged across said control electrode and said cathode, and a source of input voltage connected to said negative resistance means to vary the magnitude thereof.

2. A circuit arrangement according to claim 1 wherein said negative resistance means comprises an auxiliary tube having a control grid and circuit means connecting said control grid to said first point.

3. A circuit arrangement according to claim 2, further comprising circuit means connecting said source of input voltage to said control grid.

4. In a frequency generating system, the combination, with an oscillator tube having a cathode, an output electrode, a control electrode and a tuned circuit connected between said output electrode and said control electrode, of a phase shifting network inserted between said tuned circuit and said control electrode, said phase shifting network comprising a reactive series arm and a negative shunt resistance connected between said control electrode and said cathode.

5. In a frequency generating system, the combination according to claim 4 wherein said phase shifting network further comprises a positive shunt resistance connected in parallel with said negative shunt resistance.

6. In a frequency generating system, the combination according to claim 5, further comprising circuit means for varying the relative magnitude of said negative and positive shunt resistances under the control of an input voltage.

7. In a frequency generating system, the combination according to claim 6 wherein said negative shunt resistance comprises an auxiliary tube having a control grid and circuit means connecting said control grid to said output electrode and to a source of said input voltage.

8. A frequency generator comprising an oscillator tube provided with a cathode, an output electrode and a control electrode, a parallel tuned circuit, a source of direct current potential for said oscillator tube connected to an intermediate tap on said circuit, conductor means connecting said output electrode to a point on said circuit located at one side of said tap, circuit means including a high-reactance condenser connecting said control electrode to another point on said circuit located at the other side of said tap, an auxiliary tube having a cathode connected to the cathode of said oscillator tube and further having a grid and a plate, circuit means including a first coupling condenser connecting said plate of said auxiliary tube to said control electrode of said oscillator tube, circuit means including a second coupling condenser connecting said grid of said auxiliary tube to a point on said tuned circuit located at said one side of said tap, a source of direct current potential for said auxiliary tube, and plate resistor means intercoupling said last-mentioned source and said plate of said auxiliary tube.

9. A frequency generator according to claim 8, comprising further circuit means for applying a control voltage to said grid of said auxiliary tube whereby the internal resistance of said auxiliary tube may be varied.

10. A frequency generator according to claim 8, further comprising a grid leak resistor connected between said control electrode of said oscillator tube and the cathodes of both of said tubes.

EDUARD HERMAN HUGENHOLTZ.
EGBERT SCHOLTEN.

REFERENCES CITED

The following references are of record in the file of this patent:

UNITED STATES PATENTS

| Number | Name | Date |
|---|---|---|
| 2,321,269 | Artzt | June 8, 1943 |
| 2,363,918 | Wilcox et al. | Nov. 28, 1944 |